(12) United States Patent
Shmilovich et al.

(10) Patent No.: US 8,336,828 B2
(45) Date of Patent: Dec. 25, 2012

(54) TRAVERSING JET ACTUATOR

(75) Inventors: Arvin Shmilovich, Huntington Beach, CA (US); Yoram Yadlin, Irvine, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 12/617,214

(22) Filed: Nov. 12, 2009

(65) Prior Publication Data

US 2011/0108672 A1 May 12, 2011

(51) Int. Cl.
*B64C 3/00* (2006.01)
*B64C 21/04* (2006.01)

(52) U.S. Cl. ........................................ 244/207

(58) Field of Classification Search ................ 244/207, 244/208, 200.1, 201, 198; 137/624.13; 251/209
See application file for complete search history.

(56) References Cited

U.S. PATENT DOCUMENTS

| | | | | |
|---|---|---|---|---|
| 1,775,757 A * | 9/1930 | Gay | ................ | 244/207 |
| 2,091,395 A * | 8/1937 | Perrin | ................ | 244/134 C |
| 2,896,881 A * | 7/1959 | Attinello | ................ | 244/207 |
| 3,005,496 A * | 10/1961 | Nichols | ................ | 416/41 |
| 3,025,026 A * | 3/1962 | Nichols | ................ | 244/87 |
| 3,142,457 A * | 7/1964 | Quenzler | ................ | 244/203 |
| 3,545,701 A * | 12/1970 | Bertin et al. | ................ | 244/12.3 |
| 3,692,259 A * | 9/1972 | Yuan | ................ | 244/199.3 |
| 3,790,107 A * | 2/1974 | Renshaw | ................ | 244/207 |
| 3,917,193 A * | 11/1975 | Runnels, Jr. | ................ | 244/207 |
| 3,936,013 A * | 2/1976 | Yuan | ................ | 244/199.3 |
| 4,102,357 A * | 7/1978 | Charlton | ................ | 137/625.32 |
| 5,322,222 A | 6/1994 | Lott | | |
| 5,743,493 A * | 4/1998 | McCaughan | ................ | 244/130 |
| 5,765,776 A * | 6/1998 | Rogers et al. | ................ | 244/12.2 |
| 5,791,601 A * | 8/1998 | Dancila et al. | ................ | 244/207 |
| 6,142,425 A * | 11/2000 | Armanios et al. | ................ | 244/207 |
| 6,390,116 B1 * | 5/2002 | Kim et al. | ................ | 137/14 |
| 7,134,631 B2 * | 11/2006 | Loth | ................ | 244/209 |
| 7,984,879 B2 * | 7/2011 | Cook et al. | ................ | 244/207 |
| 2006/0060723 A1 * | 3/2006 | Greenblatt | ................ | 244/207 |
| 2009/0108125 A1 * | 4/2009 | Shmilovich et al. | ................ | 244/15 |
| 2011/0024574 A1 * | 2/2011 | Lorkowski | ................ | 244/206 |

OTHER PUBLICATIONS

GB Search and Examination Report for application GB1018033.9 dated Feb. 18, 2011.
McLean et al., "Study of the Application of Separation Control by Unsteady Excitation to Civil Transport Aircraft", Jun. 1999, NASA-CR-1999-209338, pp. 1-66.

\* cited by examiner

*Primary Examiner* — Tien Dinh
*Assistant Examiner* — Michael A Fabula
(74) *Attorney, Agent, or Firm* — Yee & Associates, P.C.

(57) ABSTRACT

An apparatus comprises a platform configured to move in a streamwise direction, an actuation unit associated with a control surface of the platform, a fluid source configured to supply an airflow to the actuation unit, and a control unit for moving an air jet across the control surface. The actuation unit is configured to form a traversing air jet pointing in the streamwise direction.

26 Claims, 10 Drawing Sheets

TRAVERSING JET ACTUATOR

BACKGROUND INFORMATION

1. Field

The present disclosure relates generally to aircraft and, in particular, to a method and apparatus for a fixed-wing aircraft. Still more particularly, the present disclosure relates to a method and apparatus for a fixed-wing aircraft with increased lift.

2. Background

A fixed-wing aircraft is a heavier-than-air vehicle capable of flying in the air. A fixed-wing aircraft is capable of flying due to lift, which is generally generated by the wings of the aircraft. The amount of lift generated by the wings of a fixed-wing aircraft is proportional to the airspeed of the aircraft. At lower airspeeds the wings of an aircraft generate less lift. If the airspeed of the fixed-wing aircraft drops below a stall speed, less lift is created. The amount of lift generated by the aircraft's wings can be a challenge during take-off and landing periods when airspeed levels are lower.

Flaps are generally used on most fixed-wing aircraft to create additional lift during takeoff and landing periods. Flaps increase the camber of the wing airfoil, which increases the coefficient of lift for the wing and ultimately the amount of lift generated. Flaps can also increase the planform area of the wing and thus generate more lift. However, flaps also may add drag and increase the airframe noise generated by the aircraft.

Additionally, the aircraft's angle of attack can be increased to generate additional lift during take-off and landing periods. The angle of attack refers to the angle of an aircraft relative to the ambient flow. Increasing angle of attack during take-off and landing periods can increase the amount of lift generated by the wings. However, there are limits on how much additional lift can be generated. Further, increasing the angle of attack means that the nose of the aircraft is higher than the aft of the aircraft. This can make landing difficult due to restrictions. Also, it may pose a risk of the tail of the aircraft contacting the runway. This risk can be reduced by using longer landing gear, but will result in greater airplane weight.

Further, flow control may be employed to enhance lift capability during aircraft takeoff and landing. Ambient air flowing over the surface of a wing or a flap may not turn around and follow the entire upper surface of the wing or flap. This lack of turning tends to create a separation pocket or a lack of attachment of the flow around the upper surface of the wing or flap. The separation pocket decreases the amount of lift generated by the aircraft.

Flow control can be used to enhance lift performance by using a fluidic source, such as bleed air from an engine or a special purpose compressor. Airflow is ejected out of the aircraft from across the top of the wings or flaps in the general streamwise direction. These ejected air streams impart momentum into the flow. This momentum causes the flow to better turn around and follow the surface of the wing and the flap. Consequently, circulation increases around the entire wing and higher lift is obtained.

However, current methods of airflow control require substantial amounts of ejected airflow to achieve meaningful design targets. The aircraft engines can be used to supply air for actuation by "bleeding" compressed air from inside the engine, but design targets require substantial amount of bleed air. The requirement of engine bleed impacts the size and efficiency of the aircraft engines. The larger the bleed requirement, the larger and heavier the engine needed. Larger and heavier engines lead to an increase in aircraft gross weight and engine cost. In addition, bleed requirements reduce the efficiency of the engines. Alternatively, a separate air compressor can also be used in conjunction with a duct delivery system to supply the air for actuation. However, the addition of separate air compressors also leads to additional weight.

Accordingly, it would be advantageous to have a method and apparatus which takes into account one or more of the issues discussed above as well as possibly other issues.

SUMMARY

In one advantageous embodiment, an apparatus may comprise a platform configured to move in a streamwise direction, an actuation unit associated with a control surface of the platform, a fluid source configured to supply an airflow to the actuation unit, and a control unit for moving an air jet across the control surface. The actuation unit may be configured to form an air jet flowing in the streamwise direction.

In another advantageous embodiment, an apparatus may comprise a control surface of an aircraft, an outer cylinder located inside the control surface and centered on an axis, an inner cylinder located inside the outer cylinder and centered on the axis, and a fluid source configured to send an airflow into the inner cylinder. The control surface may extend in a spanwise direction of the aircraft and may have an ejection slot extending in the spanwise direction. The outer cylinder may have a lateral slot aligned with the ejection slot. The inner cylinder has a helical slot. The helical slot may wrap around an outer surface of the inner cylinder. A number of portions of the helical slot may overlap with the lateral slot. The inner cylinder may rotate inside the outer cylinder.

In yet another advantageous embodiment, a method is present for moving air across a control surface of an aircraft. A slot may be formed on the control surface of the aircraft, sending a stream of air out of a portion of the slot, and moving the stream of air in a periodic motion along a spanwise direction of the slot. The slot may extend in the spanwise direction. The stream of air may flow in a streamwise direction of the aircraft.

In still yet another advantageous embodiment, a method is present for producing an air jet. An outer element may be positioned inside a control surface of a platform and inner element may be positioned inside the outer element. An airflow may be sent into the inner element by a fluid source. The inner element may be rotated inside the outer element by a motor. The outer element may have a lateral slot, and the inner element may have a helical slot. The helical slot may wrap around an outer surface of the inner element. A number of portions of the helical slot may overlap with the lateral slot.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
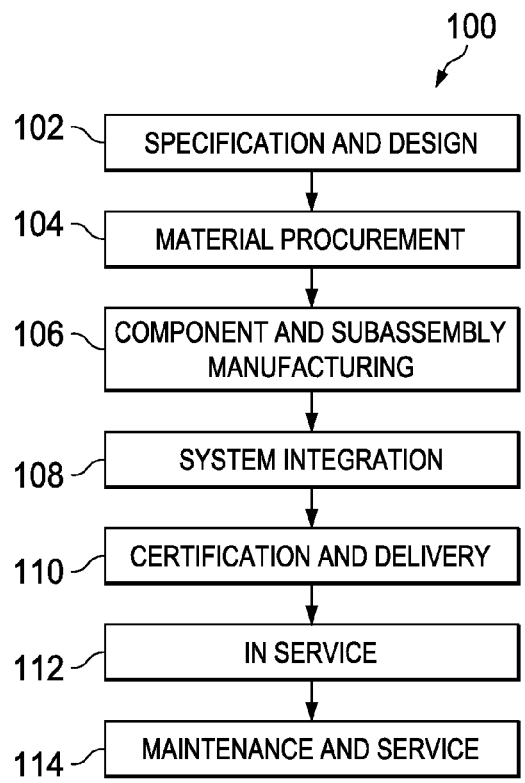
FIG. 1 is an illustration of an aircraft manufacturing and service method in accordance with an advantageous embodiment.
Figure 2:
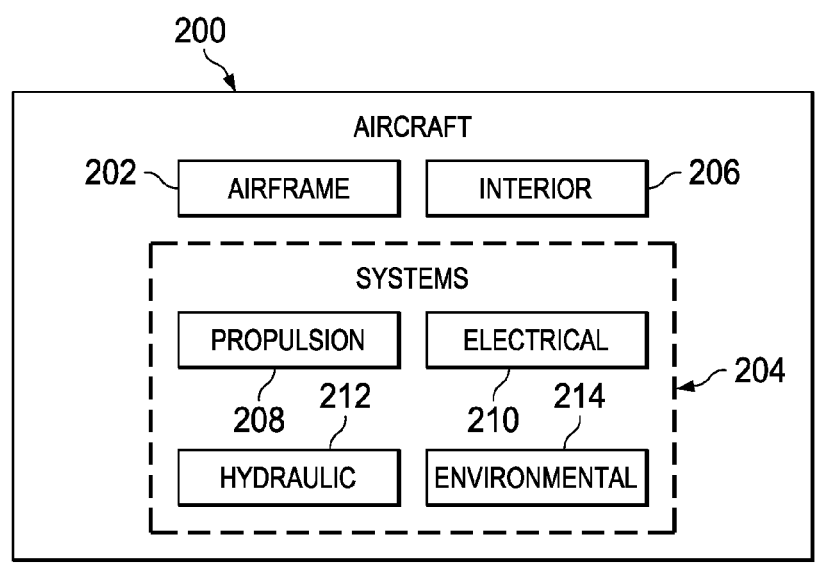
FIG. 2 is illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

A first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Advantageous embodiments relate to a method and apparatus for a fixed-wing aircraft with increased lift. The different advantageous embodiments recognize and take into account that a viable approach must consider the limited system resources available on the aircraft to attain performance goals. The key requirement for a successful and practical design is use of low power requirements while achieving design targets.

Thus, the different advantageous embodiments provide a method and apparatus for a traversing jet actuator. One or more embodiments may include an apparatus having a platform configured to move in a streamwise direction, an actuation unit associated with a control surface of the platform, a fluid source configured to supply an air flow to the actuation unit, and a control unit for moving an air jet across the control surface. The actuation unit is configured to form an air jet flowing in the streamwise direction.

Figure 3:
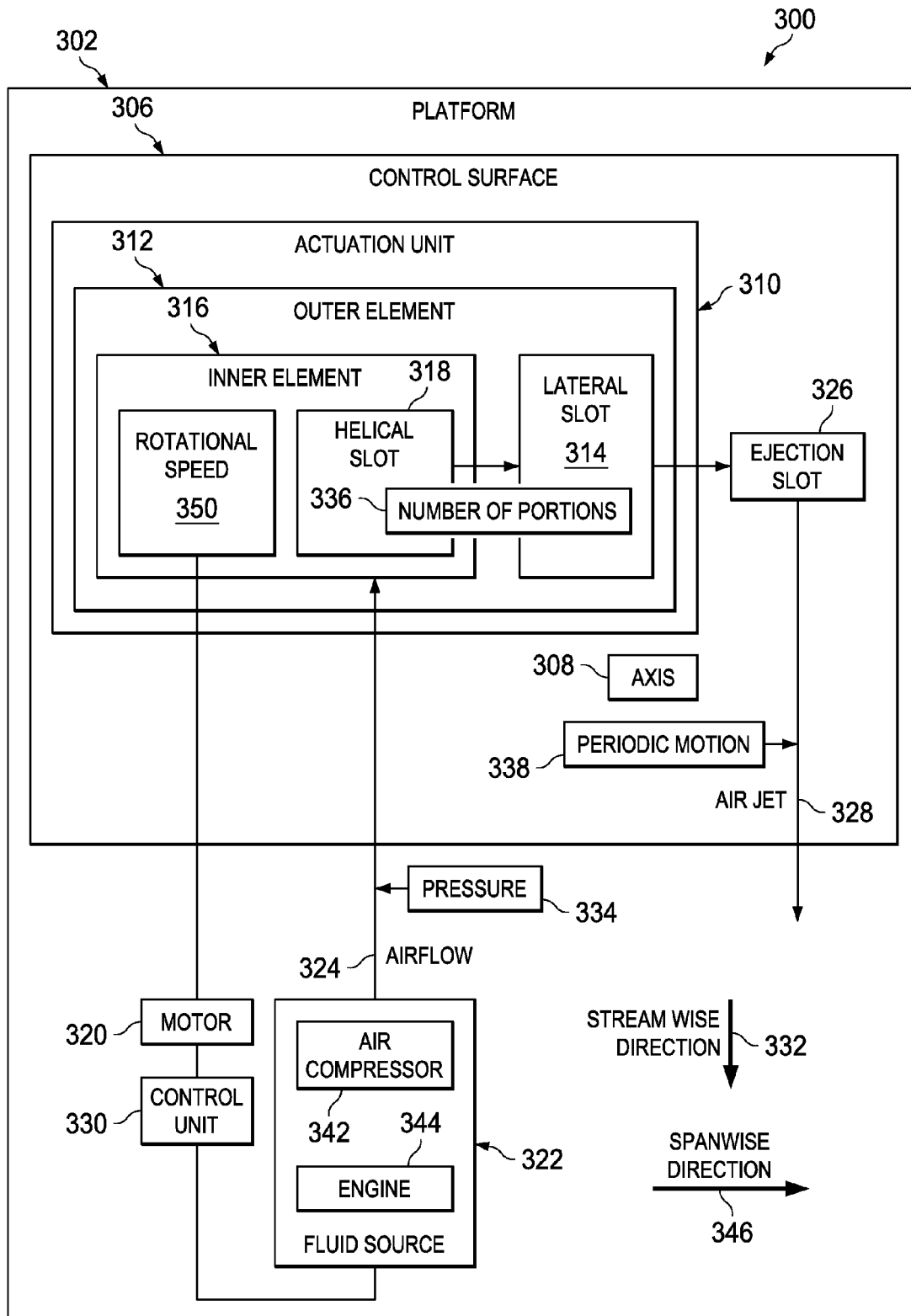
FIG. 3 is an illustration of an apparatus for improving lift of a platform in accordance with an advantageous embodiment.

With reference now to FIG. 3, an illustration of an apparatus for improving lift of a platform is depicted in accordance with an advantageous embodiment. The apparatus is generally designated by reference number 300. In this advantageous embodiment, platform 302 may take the form of an aircraft, such as aircraft 200 in FIG. 2. In these illustrative examples, platform 302 has control surface 306. For example, without limitation, control surface 306 could be an aileron, a flap, a slat, a spoiler, or an air brake, and/or any other suitable control surface.

In these depicted examples, control surface 306 has ejection slot 326. Ejection slot 326 is an opening in control surface 306. Ejection slot 326 may extend along control surface 306 in spanwise direction 346. As used herein, the spanwise direction is associated with a span of a control surface. For example, spanwise direction is the direction that a wing extends from the fuselage of an aircraft.

Control surface 306 includes actuation unit 310. Actuation unit 310 may be a single actuation unit or a number of actuation units. For example, a number of actuation units may be used in order to span the entire length of control surface 306. In these examples, actuation unit 310 may be located inside control surface 306.

Actuation unit 310 has outer element 312 and inner element 316. In these illustrative examples, outer element 312 and inner element 316 may be concentric hollow cylinders. Concentric cylinders are cylinders that share a similar axis. A cylinder having a smaller radius can sit inside of a cylinder having a larger radius.

Outer element 312 is positioned along axis 308. Axis 308 runs across with control surface 306. Outer element 312 has lateral slot 314. Outer element 312 is positioned in control surface 306 such that ejection slot 326 and lateral slot 314 align and overlap.

Actuation unit 310 also includes inner element 316. Inner element 316 has a helical slot 318. As used herein, a helical slot is an opening that is spiral in form. A helical slot may be formed by slicing along the surface of a rotating cylinder. Inner element 316 is placed inside outer element 312 such that inner element 316 and outer element 312 share substantially the same axis, such as axis 308 for example. Helical slot 318 runs along the outside of inner element 316 in a spiral fashion in the direction of axis 308.

In these illustrative examples, helical slot 318 is formed such that a number of portions 336 of helical slot 318 and lateral slot 314 overlap. For example, helical slot 318 may spiral around axis 308. Lateral slot 314 may extend in the same direction as axis 308. Each time a part of helical slot 318 and lateral slot 314 intersect, they create an overlapping portion. Depending upon how tightly helical slot 318 may spiral around axis 308, any number of portions of helical slot 318 and lateral slot 314 may overlap.

Inner element 316 and outer element 312 may be composed of various different materials. For example, without limitation, inner element 316 and outer element 312 may be comprised of materials selected from at least one of aluminum, steel, titanium, a composite material, and/or any other suitable material.

In these illustrative examples, motor 320 is connected to inner element 316. Motor 320 supplies a force to inner element 316 to cause inner element 316 to rotate around axis 308. Control unit 330 is connected to motor 320. Control unit 330 can regulate a rotational speed 350 of inner element 316. For example, without limitation, motor 320 may be an electrical motor, a hydraulic motor, a pneumatic motor, or any other suitable type of motor.

Fluid source 322 sends airflow 324 into inner element 316. Airflow 324 is a stream of air having pressure 334. Airflow 324 may have a pressure greater than a relative external air pressure for a given altitude of the aircraft. The pressure difference between airflow 324 and the external flow determines the velocity of air jet 328. Control unit 330 is connected to fluid source 322. Control unit 330 can regulate a speed and pressure 334 of airflow 324.

Fluid source 322 may be a separate device included in platform 302, such as, for example, air compressor 342. Fluid source 322 may also be engine 344 of platform 302. Platform 302 may be configured to bleed compressed air from engine 344 to supply airflow 324. In these illustrative examples, airflow 324 flows outwardly through helical slot 318 of inner element 316, and through lateral slot 314 of outer element 312, then out ejection slot 326 of control surface 306. As airflow 324 flows out ejection slot 326, it exits control surface 306 to form a jet of air, such as air jet 328.

In these illustrative examples, as inner element 316 rotates, an opening is formed at number of portions 336 where helical slot 318 momentarily overlaps with lateral slot 314. Airflow 324 flows through ejection slot 326 and into an external airflow field. The continuous rotation of inner element 316 along with pressure 334 produces air jet 328. As inner element 316 continues to rotate, air jet 328 flows in a direction substantially perpendicular to axis 308. Additionally, the rotation of inner element 316 moves air jet 328 along axis 308 in periodic motion 338. Thus, air jet 328 moves along or traverses control surface 306 while flowing in the streamwise direction of platform 302. The streamwise direction generally refers to the direction external air flows across the surfaces of platform 302 while flying.

As discussed above, a number of actuation units may be used to span the entire length of control surface 306. The length of air jet 328 is determined by the length of the overlap of helical slot 318 with lateral slot 314. The width of air jet 328 is determined by the width of lateral slot 314. The speed with which air jet 328 traverses control surface 306 is determined by rotational speed 350 of inner element 316.

In these illustrative examples, each of the number of actuation units produces an air jet or a number of air jets over the span of the actuation unit. This number of air jets may or may not be synchronized over the span of control surface 306. Additionally, the number of jets may move across control surface 306 from a first point to a second point then back to the first point. Alternatively, the number of jets may move across control surface 306 just from a first point to a second point then repeat the same motion. Still yet, any number of these movement patterns may be incorporated into different numbers of actuation units that may or may not be synchronized together.

Air jet 328 flowing perpendicular to and moving along axis 308 results in lift increment of platform 302. The lateral motion of air jet 328 produces an instantaneous flow attachment in the region around control surface 306. As air jet 328 traverses along control surface 306, the created effects linger. The instantaneous flow remains attached over all of control surface 306, creating a streamlining effect around control surface 306. This streamlining effect generates greater global circulation, leading to lift augmentation of control surface 306, while the amount of actuation required to create such augmentation is greatly reduced. For specified air jet width and traversing speeds, the amount of airflow required to produce the same amount of lift is approximately one-eighth the amount of airflow needed for constant blowing methods.

The illustration of platform 302 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, platform 302 may take other forms. In other advantageous embodiments, actuation unit 310 may not include both outer element 312 and inner element 316. Rather, inner element 316 may be inserted directly into control surface 306. In other advantageous embodiments, inner element 316 may have the lateral slot and be stationary, while outer element 312 has the helical slot and rotates. In other advantageous embodiments, actuation unit 310 may be inside a wing, a stabilizer, or some other platform component, with a configuration such as control surface 306 as described above.

For example, in some advantageous embodiments, control surface 306 may be a flap. There are several different types of flaps. Control surface 306 could be, for example, without limitation, a Krueger flap, plain flap, split flap, Fowler flap, slotted flap, a simple hinge flap and/or any other suitable type of flap. Additionally, a number of actuation units may be included in different control surfaces of platform 302. For example, a number of actuation units may be included in a wing, or horizontal stabilizer of platform 302.

Figure 4:
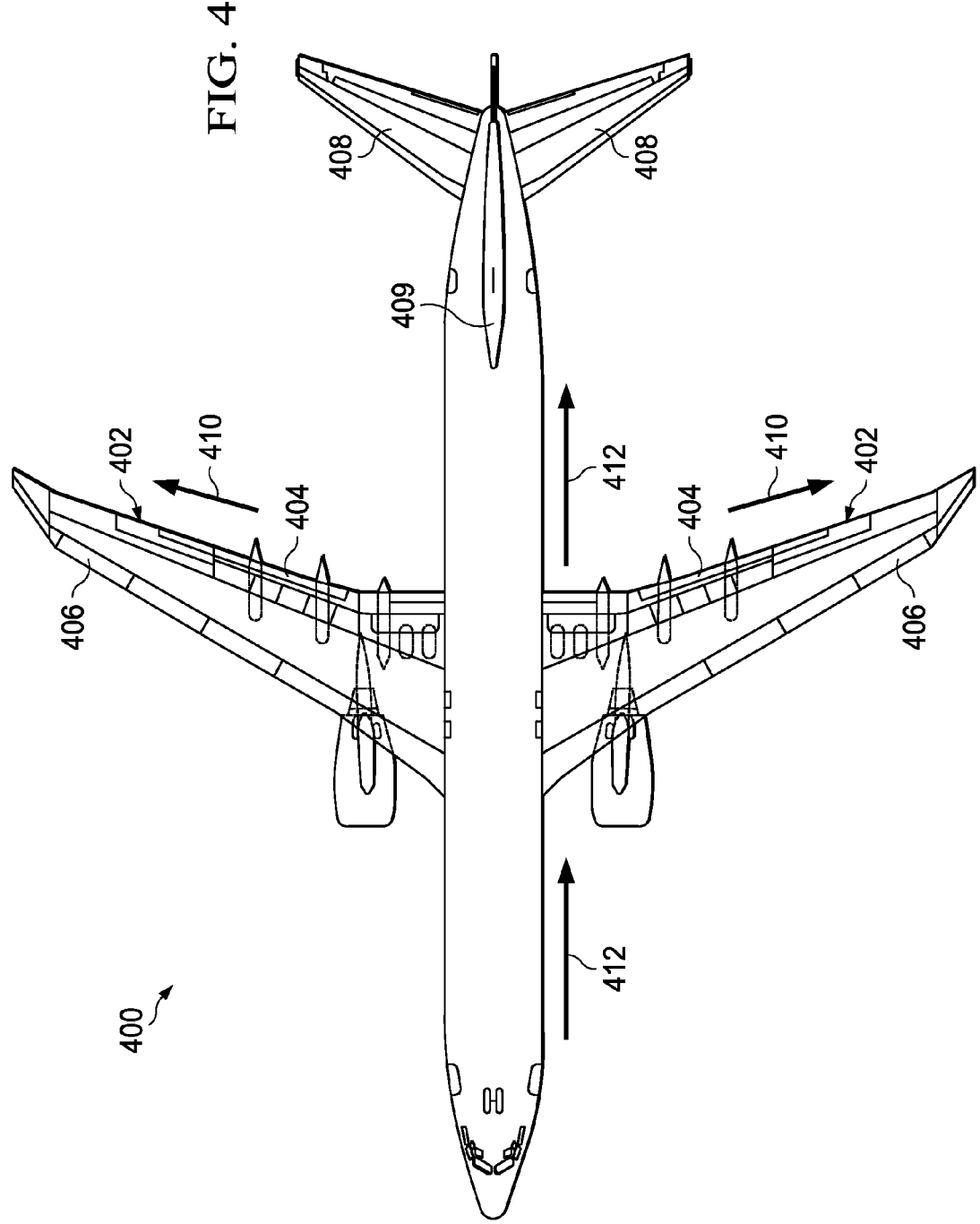
FIG. 4 is an illustration of a top view of an aircraft in accordance with an advantageous embodiment.

With reference now to FIG. 4, an illustration of a top view of an aircraft is depicted in accordance with an advantageous embodiment. In these illustrative examples, aircraft 400 is depicted. Aircraft 400 is an example of one implementation of platform 302 in FIG. 3. In this example, the different advantageous embodiments may be implemented on the wings 402 of aircraft 400. A number of actuation units, such as actuation unit 310 in FIG. 3, may be used in wings 402. A number of actuation units may also be used in flaps 404, such as depicted by control surface 306 in FIG. 3, or in leading edge slats 406. Additionally, a number of actuation units may be used in horizontal stabilizers 408, or in the vertical stabilizer 409.

Spanwise direction 410 is shown for wings 402. Spanwise direction 410 extends from the center of aircraft 400 in the direction of wings 402. Spanwise direction 410 is an example of spanwise direction 346 in FIG. 3. Streamwise direction 412 is also shown for aircraft 400. Streamwise direction 412 generally refers to the direction of external air flowing across the surfaces of aircraft 400 while flying. Streamwise direction 412 is an example of streamwise direction 332 in FIG. 3.

Figure 5:
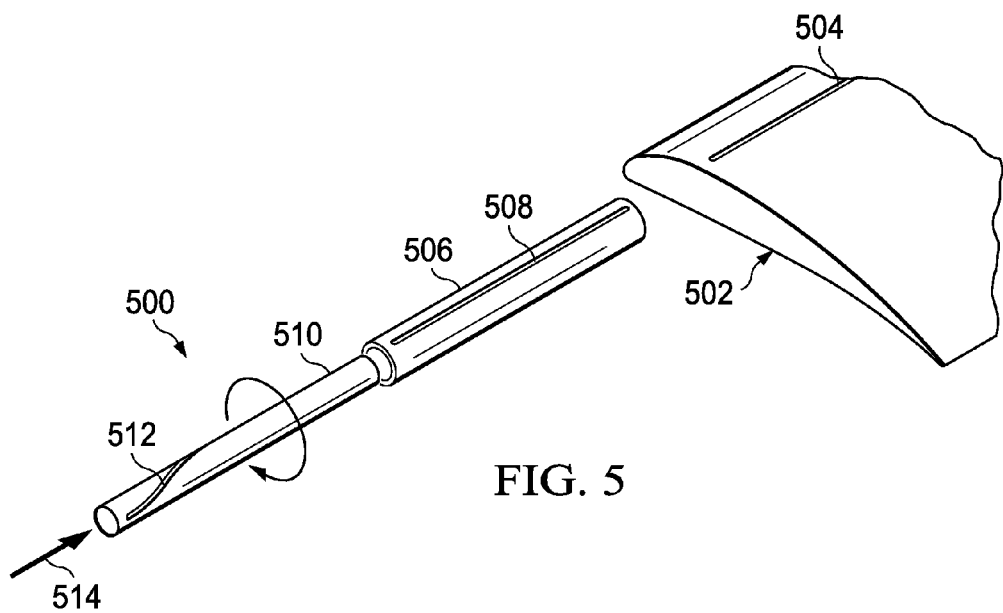
FIG. 5 is an illustration of an actuation unit in a flap and in a wing of an aircraft in accordance with an advantageous embodiment.

With reference now to FIG. 5, an illustration of an actuation unit in a flap and in a wing of an aircraft is depicted in accordance with an advantageous embodiment. In these depicted examples, actuation unit 500 is depicted prior to insertion into flap 502. Flap 502, for example, may be implemented as one of flaps 404 in FIG. 4. Actuation unit 500 includes outer element 506 and inner element 510. Outer element 506 is inserted in flap 502 such that flap slot 504 and lateral slot 508 align and overlap. Inner element 510 is inserted in outer element 506 such that only a portion of helical slot 512 and lateral slot 508 overlap. Inner element 510 rotates inside of outer element 506 by a motor, not shown in FIG. 4. Fluid source 514 supplies airflow into inner element 510.

Figure 6:
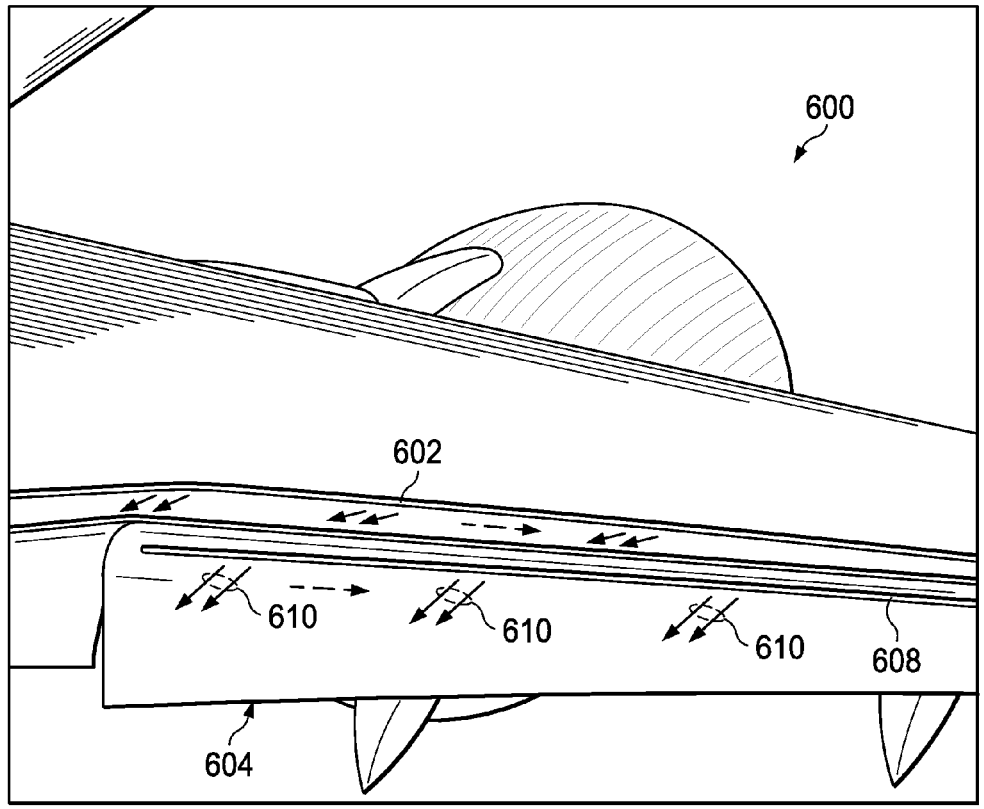
FIG. 6 is an illustration of a rear perspective view of a wing of an aircraft in accordance with an advantageous embodiment.

With reference now to FIG. 6, an illustration of a rear perspective of a wing of an aircraft is depicted in accordance with an advantageous embodiment. Wing 600 may be an example of one implementation of wings 402 in FIG. 4. In these depicted examples, a number of actuation units, such as actuation unit 310 in FIG. 3, are inserted into wing 600 as well as flap 604. Number of air jets 610 flow in a streamwise direction out of wing slot 602 and flap slot 608 from several locations. Number of air jets 610 move in a lateral or spanwise direction.

Figure 7:
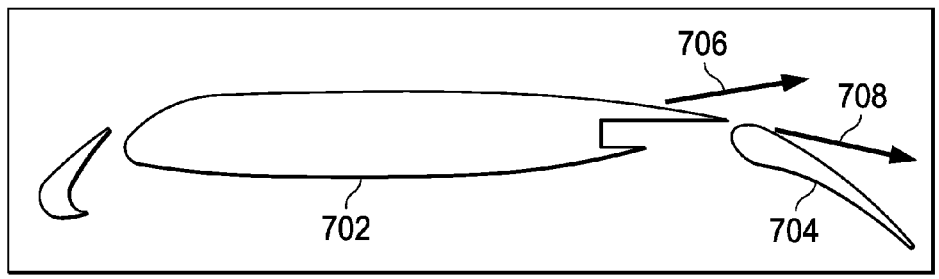
FIG. 7 is an illustration of a cross-sectional view of the wing of FIG. 6 in accordance with an advantageous embodiment.

With reference now to FIG. 7, an illustration of a cross-sectional view of the wing in FIG. 6 is depicted in accordance with an advantageous embodiment. Air jet 706 flows in a streamwise direction, such as streamwise direction 412 in FIG. 4. Air jet 706 flows out of slots in wing 702. Air jet 706 is an example of one implementation of air jet 328 flowing out of ejection slot 326 of control surface 306 in FIG. 3. Air jet 708 flows in a streamwise direction, such as streamwise direction 412 in FIG. 4. Air jet 708 flows out of slots in flap 704. Air jet 706 is an example of one implementation of air jet 328 flowing out of ejection slot 326 of control surface 306 in FIG. 3.

Figure 8:
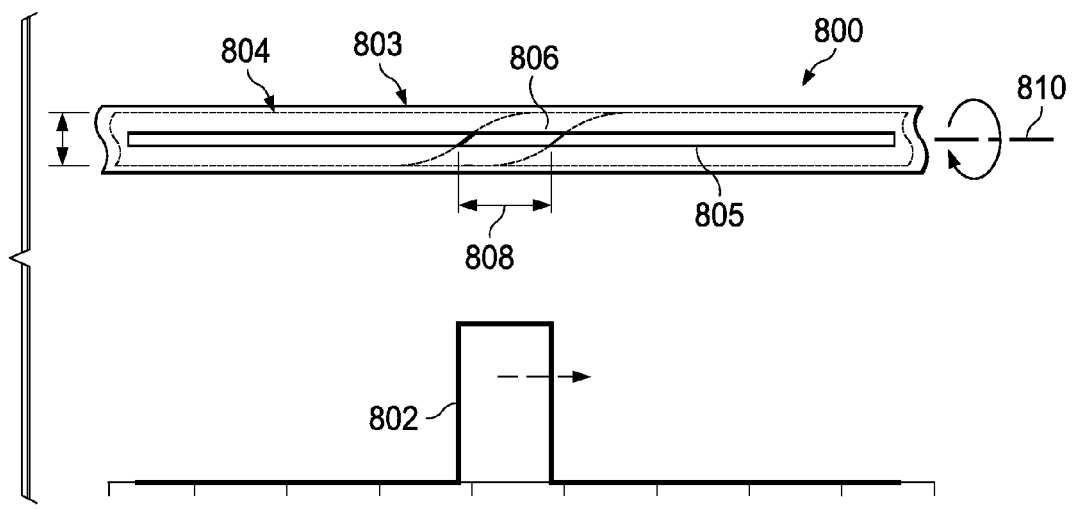
FIG. 8 is an illustration of actuation modes of an actuation unit in accordance with an advantageous embodiment.
Figure 9:
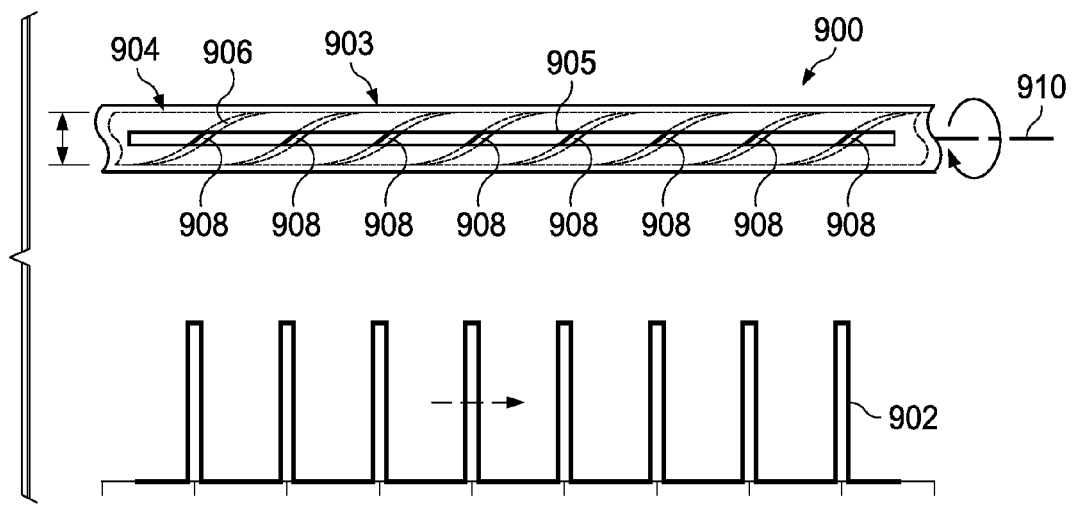
FIG. 9 is an illustration of actuation modes of an actuation unit in accordance with an advantageous embodiment.

With reference now to FIGS. 8 and 9, illustrations of actuation modes of an actuation unit are depicted in accordance with advantageous embodiments. FIGS. 8 and 9 illustrate a top view of actuation units 800 and 900. Actuation units 800 and 900 may be examples of implementations of actuation unit 310 in FIG. 3. Inner elements 804 and 904 are visible inside outer elements 803 and 903. The accompanying air jet ejection signals are also shown for the different actuation modes. The width of the air jet is defined by the width of lateral slots 805 and 905 of outer elements 803 and 903, respectively. Air jet length is defined by the overlap of helical slots 806 and 906 of inner elements 804 and 904 with lateral slots 805 and 905 of outer elements 803 and 903.

In these illustrative examples, a number of actuation modes may be used to increase lift. The parameters of the actuation mode will be selected to best meet the design targets and goals of the particular application. An actuation mode refers to a set of device parameters that are used to obtain desired results. For example, one actuation mode may produce one air jet that is about one eighth the length of the actuation unit. Another actuation mode may produce sixteen individual air jets that as a whole are about one-sixteenth the length of the entire air jet. Other actuation modes may vary the pressure of the air supplied in combination with varying the length and number of the air jets. Still other actuation modes may vary the speed that the air jets move across the control surface through the rotational speed of the inner element, in combination with varying the length and number of the air jets. Still yet other actuation modes may synchronize the movement of the number of air jets across a number of actuation units.

FIG. 8 illustrates an actuation mode for overlap 808, which is about one-eighth the length of actuation unit 800. The periodic motion of air jet 802 depends on the rotational speed of inner element 804. For helical slot 806, the frequency of actuation corresponds to the rotational frequency of inner element 804. Thus, the amount of airflow for air jet 802 is about one-eighth of the amount of airflow for constant blowing over the distance of actuation unit 800, for a given constant airflow speed. The overlap of helical slot 806 of inner element 804 with lateral slot 805 of outer element 803 forms overlap 808. In this example, overlap 808 is about one-eighth the length of actuation unit 800. As inner element 804 continues to rotate, air jet 802 moves in a periodic motion along axis 810.

FIG. 9 illustrates an actuation mode where the air jet is divided into number of air jets 902. In this example, helical slot 906 is more tightly wound than helical slot 806 in FIG. 8. Helical slot 906 forms eight overlapping sections 908 with lateral slot 905 over the length of actuation unit 900. Each overlapping section 908 is about one-eighth the length of overlap 808 in FIG. 8. In this example, number of air jets 902 has the same amount of airflow as air jet 802 in FIG. 8. Thus, air jet 802 in FIG. 8 is effectively split into eight air jets. As inner element 904 continues to rotate, number of air jets 902 moves in a periodic motion along axis 910.

The illustration of different actuation modes described in FIGS. 8 and 9 are not an exhaustive combination of actuation modes. Different advantageous embodiments may be implemented using different overlap lengths, numbers of air jets, and actuation unit lengths without departing from the scope of the present disclosure. For example, in some advantageous embodiments, sixteen air jets may be created, each air jet having a length of about one-sixteenth that of air jet 802 in FIG. 8. In some advantageous embodiments, a number of actuation units may be used. The number of actuation units may have a number of air jets that may or may not be synchronized together to produce desired effects.

Figure 10:
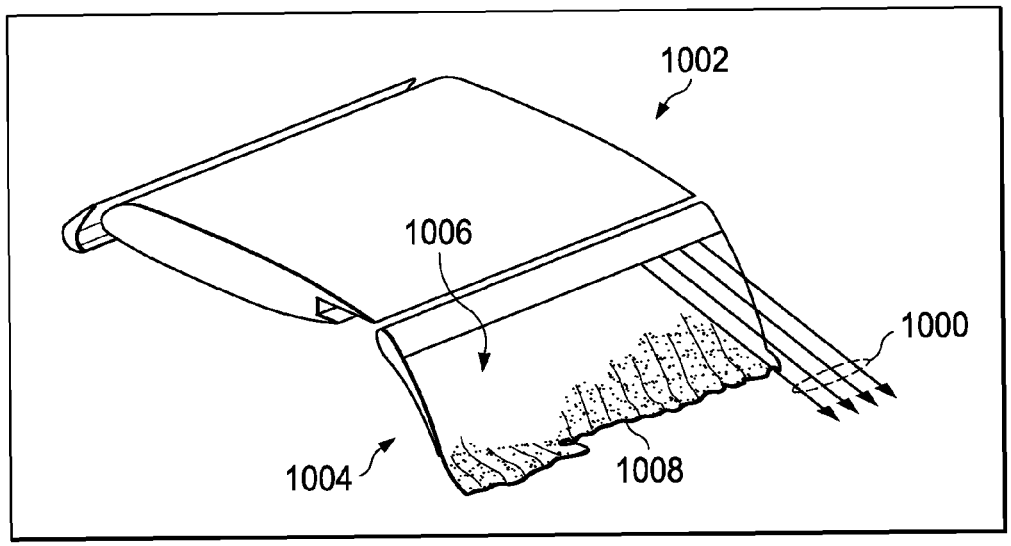
FIG. 10 is an illustration of a traversing air jet on a section of a wing of an aircraft in accordance with an advantageous embodiment.
Figure 11:
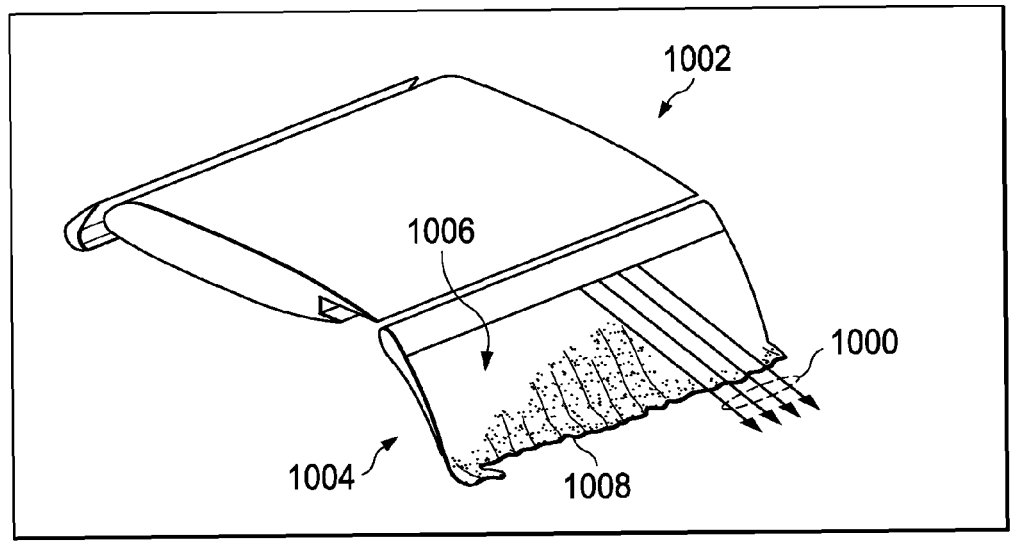
FIG. 11 is an illustration of a traversing air jet on a section of a wing of an aircraft in accordance with an advantageous embodiment.
Figure 12:
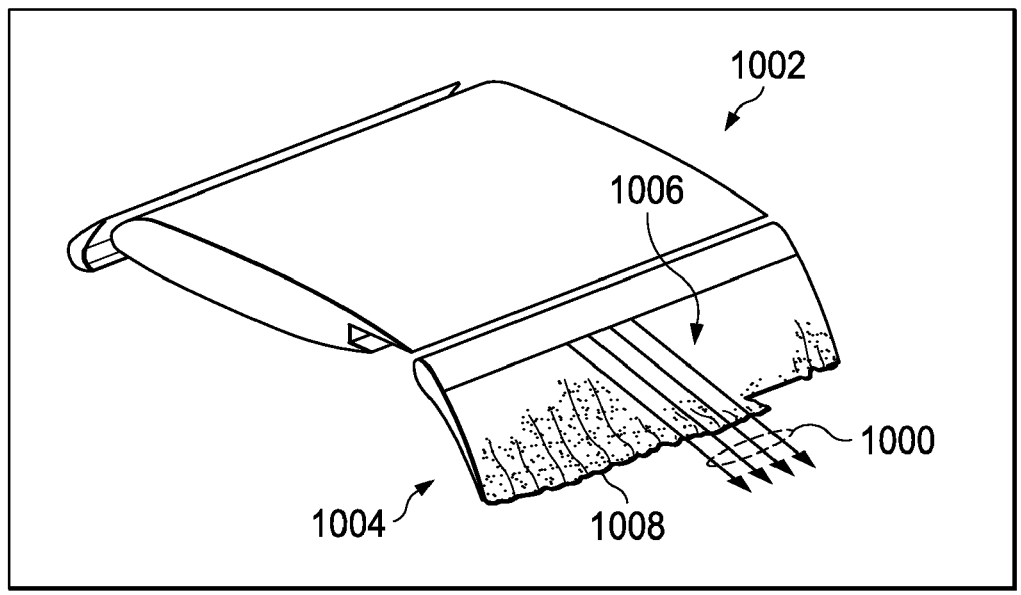
FIG. 12 is an illustration of a traversing air jet on a section of a wing of an aircraft in accordance with an advantageous embodiment.
Figure 13:
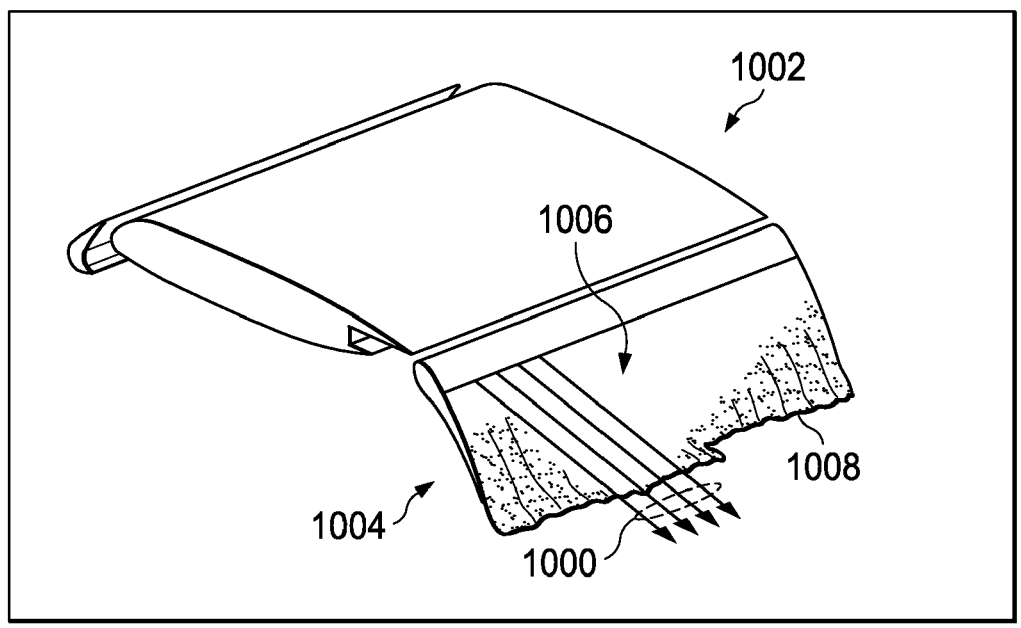
FIG. 13 is an illustration of a traversing air jet on a section of a wing of an aircraft in accordance with an advantageous embodiment.

Turning now to FIGS. 10-13, illustrations of a traversing air jet on a section of a wing of an aircraft are depicted in accordance with an advantageous embodiment. FIG. 10 illustrates air jet 1000 flowing through a slot in flap 1004, such as ejection slot 326 in FIG. 3. In these depicted examples, air jet 1000 produces area of attachment 1006 above flap 1004. Instantaneous flow separation pocket 1008 is also shown.

FIGS. 10-13 illustrate air jet 1000 traversing across wing 1002 at successive time intervals. Air jet 1000 traverses across wing 1002 in a periodic motion. The speed of the traversing air jet is controlled by the frequency of rotation of the inner element, such as inner element 316 in FIG. 3. In these illustrative examples, as air jet 1000 moves along flap 1004 the effects created by area of attachment 1006 linger even after air jet 1000 has passed. This lingering of area of attachment 1006 reduces the amount of instantaneous flow separation pocket 1008 above flap 1004. Thus, the amount of lift generated is increased while an amount of actuation needed to generate the lift is decreased.

As depicted in these examples, FIGS. 10-13 provide an illustration of a single traversing air jet for a given wing section length, such as air jet 802 in FIG. 8 as discussed above. Additionally, air jet 1000 may be split into a number of air jets that traverse the wing section, such as number of air jets 902 in FIG. 9 as discussed above.

Figure 14:
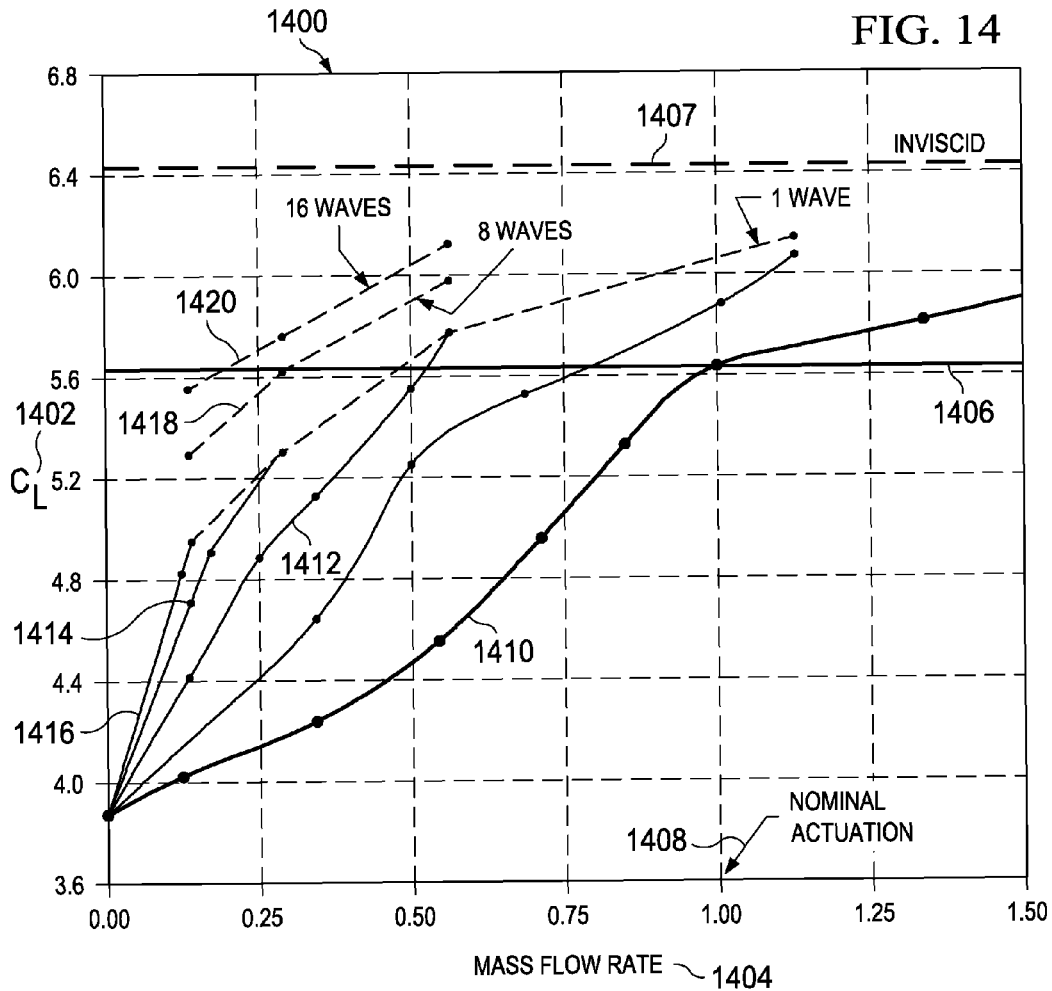
FIG. 14 is an illustration of a graph showing simulation results of a number of actuation modes in accordance with an advantageous embodiment.

With reference now to FIG. 14, an illustration of a graph showing simulation results of a number of actuation modes is depicted in accordance with an advantageous embodiment. In these depicted examples, graph 1400 shows simulation results for a number of actuation modes, such as actuation modes discussed in FIGS. 8 and 9 above at an angle of attack of about sixteen degrees. Graph 1400 shows a number of plots of coefficient of lift 1402 versus mass flow rate 1404 for a number of different actuation modes. The mass flow rate is determined by the velocity of an air jet, such as air jet 328 in FIG. 3, which is controlled by the pressure differential between the air jet and an airflow, such as airflow 324 in FIG. 3.

For example, level 1406 represents a desired level of coefficient of lift 1402. Plot 1407 represents a graph of the inviscid lift level for reference. The inviscid lift level represents an efficient or ideal flow with no loss due to viscous effects or resistance to flow.

In an illustration of an advantageous embodiment, plot 1412 represents a simulation of an actuation mode having a single air jet with a length that is about one-fourth the length of an actuation unit. For comparison in these examples, plot 1410 represents a simulation of constant blowing methods. Plot 1410 reaches level 1406 at nominal actuation 1408. Nominal actuation 1408 is a relative mass flow rate of 1. Plot 1412 reaches level 1406 with a mass flow rate 1404 of about half nominal actuation 1408.

Further, plots 1414 and 1416 represent simulations of actuation modes having a single air jet that is about one-eighth of the length of an actuation unit for plot 1414 and one-sixteenth the length of an actuation unit for plot 1416. As depicted, plots 1414 and 1416 do not reach level 1406. However, when the single air jet represented by plots 1414 and 1416 is divided into eight waves, the corresponding values for coefficient of lift are vertically shifted to plot 1418. Likewise, when the single air jet represented by plots 1414 and 1416 is divided into sixteen waves, the corresponding values for coefficient of lift are vertically shifted even higher to plot 1420. Thus, as the length of the jet decreases and the number jets the single jet is divided into increases, higher levels of coefficient of lift 1402 are obtained with lower values of mass flow rate 1404.

Figure 15:
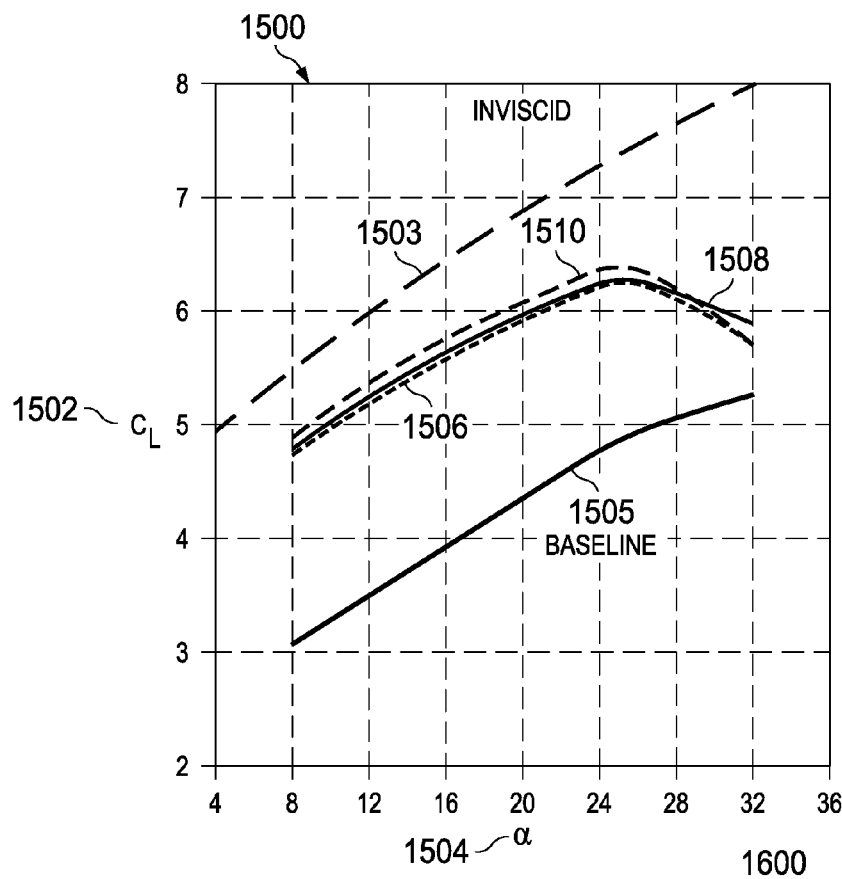
FIG. 15 is an illustration of a graph showing simulation results of a number of actuation modes in accordance with an advantageous embodiment.

With reference now to FIG. 15, an illustration of a graph showing simulation results of a number of actuation modes is depicted in accordance with an advantageous embodiment. In these depicted examples, graph 1500 shows simulation results for a number of actuation modes, such as actuation modes discussed in FIGS. 8 and 9 above. Graph 1500 shows a number of plots of coefficient of lift 1502 versus angle of attack 1504 for a number of different actuation modes. Plot 1505 represents a graph of the lift in the case with no actuation. Plot 1503 represents a graph of the inviscid lift level for reference, such as plot 1407 in FIG. 14.

In these illustrative examples, plot 1506 represents simulation results for an actuation mode having sixteen different air jets. The sum of the lengths of the air jets in the actuation mode represented by plot 1506 is one-sixteenth the length of the actuation unit. As can be seen in this illustrative example, plot 1506 has coefficient of lift 1502 levels that are almost the same as plot 1508. Plot 1508 represents simulation results for constant blowing across the entire length of the actuation unit.

Plot 1510 also represents simulation results for an actuation mode having sixteen different air jets. However, the sum of the lengths of the air jets in the actuation mode represented by plot 1510 is about one-eighth the length of the actuation unit. As can be seen in this illustrative example, plot 1506 has coefficient of lift 1502 levels that are slightly higher than constant blowing as illustrated by plot 1508. Thus, the actuation modes illustrated by plots 1506 and 1510 have similar levels of coefficient of lift 1502 as constant blowing methods represented by plot 1508.

In this illustrative example, for angle of attack 1504 equal to sixteen degrees, coefficient of lift 1502 corresponds to coefficient of lift 1402 in FIG. 14. For example, plot 1506 at angle of attack 1504 equal to sixteen degrees and plot 1420 in FIG. 14 at mass flow rate 1404 of about 0.13 have similar levels of coefficients of lift. Likewise, at angle of attack 1504 of sixteen degrees, the coefficient of lift 1502 of plot 1510 corresponds to the coefficient of lift 1402 of plot 1420 in FIG. 14 at mass flow rate 1404 of about 0.28.

Figure 16:
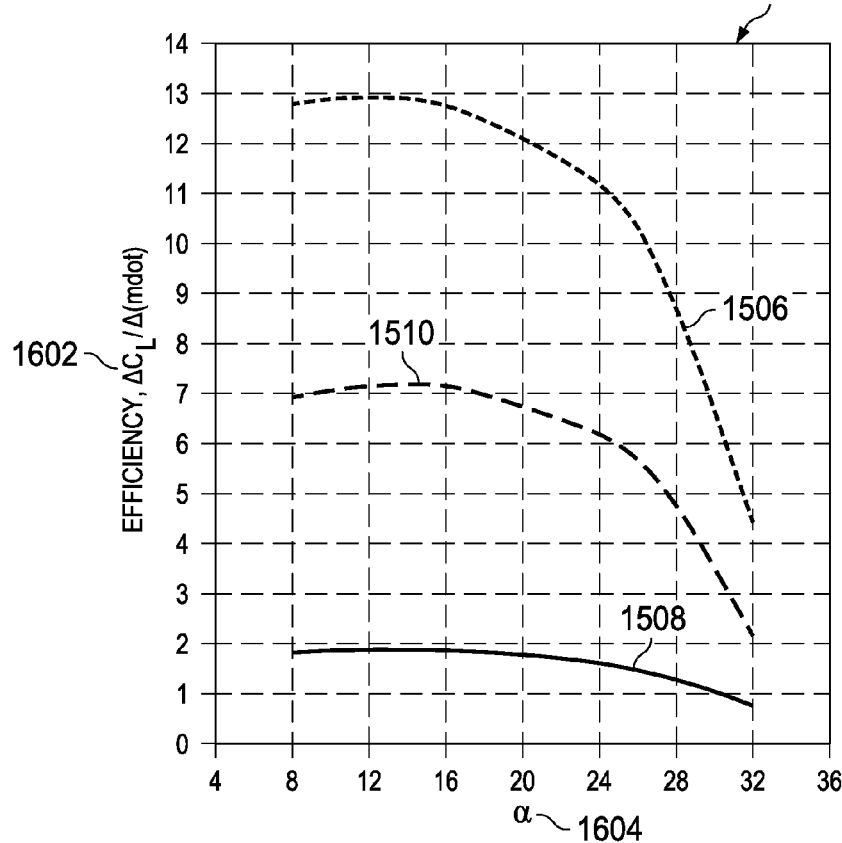
FIG. 16 is an illustration of a graph showing simulation results of a number of actuation modes in accordance with an advantageous embodiment.

With reference now to FIG. 16, an illustration of a graph showing simulation results of a number of actuation modes is depicted in accordance with an advantageous embodiment. In these depicted examples, graph 1600 shows levels of efficiency 1602 versus angle of attack 1504 for the different actuation modes depicted in FIG. 15. Levels of efficiency 1602 are determined by the change in coefficient of lift 1502 divided by the change in mass flow rate, such as mass flow rate 1404 in FIG. 14.

As illustrated in graph 1600, both plot 1506 and plot 1510 have levels of efficiency 1602 that are much higher than levels of efficiency 1602 for constant blowing methods, as represented by plot 1508. For example, plot 1510 has levels of efficiency 1602 about three and one-half times greater than plot 1508 for angle of attack 1604 ranging from about eight degrees to about eighteen degrees. This three and one-half times greater level of efficiency 1602 is due to the fact that plot 1506 represents an actuation mode having a sum of lengths of the air jets of about one-eighth that of constant blowing methods, yet having similar levels of coefficient of lift as constant blowing methods, as depicted above in FIG. 15.

Further, plot 1506 has levels of efficiency 1602 about six and one-half times greater than plot 1508 for angle of attack 1604 ranging from about eight degrees to about eighteen degrees. These further increased levels of efficiency are due to the fact that plot 1506 represents an actuation mode having a sum of lengths of the air jets of about one-sixteenth that of constant blowing methods and about one-half that of the actuation mode represented by plot 1510, while plot 1506 still has similar levels of coefficient of lift 1502 in FIG. 15 as plot 1508 and plot 1510.

Figure 17:
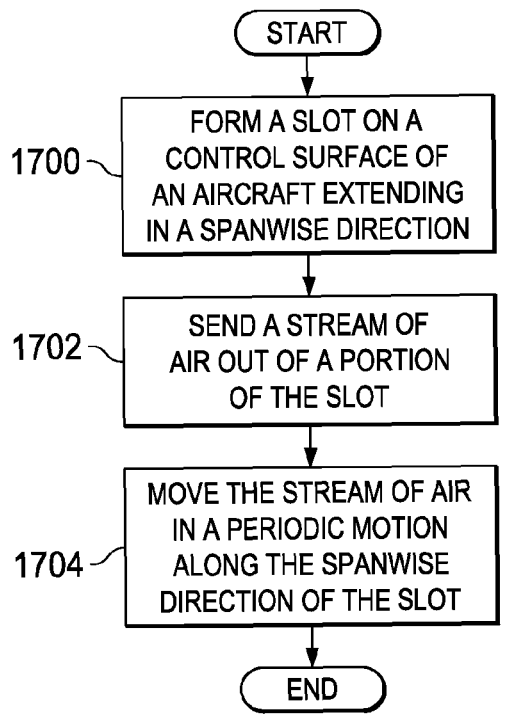
FIG. 17 is an illustration of a flowchart of a process for moving air across a control surface of an aircraft in accordance with an advantageous embodiment.

With reference now to FIG. 17, an illustration of a flowchart of a process for moving air across a control surface of an aircraft is depicted in accordance with an advantageous embodiment. The process illustrated in FIG. 17 may be implemented on a platform, such as platform 302 in FIG. 3.

The process begins by forming a slot on a control surface of an aircraft extending in a spanwise direction (operation 1700). In operation 1700, the control surface may be a wing or a flap of the aircraft, for example and without limitation. Thereafter, the process sends a stream of air out of a portion of the slot (operation 1702). In operation 1702, the stream of air flows in a streamwise direction of the aircraft. The stream of air may be supplied by a fluid source, such as fluid source 322 in FIG. 3. The pressure of the stream of air may be regulated by a control unit, such as control unit 330 in FIG. 3.

The process then moves the stream of air in a periodic motion along the spanwise direction of the slot (operation 1704), with the process terminating thereafter. The speed of the stream of air may be regulated by a control unit such as control unit 330 in FIG. 3. The stream of air flowing out of the control surface in the streamwise direction and moving along the control surface in a spanwise direction increases the lift of the aircraft, while reducing the amount of airflow supplied.

Figure 18:
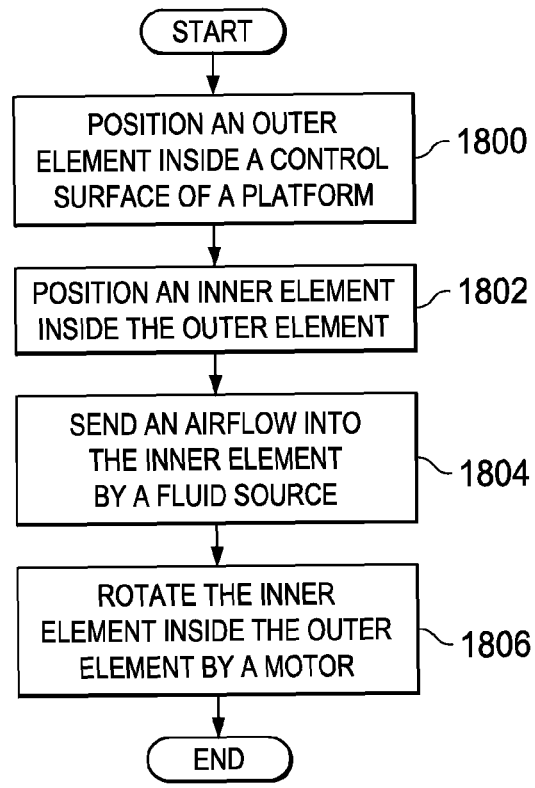
FIG. 18 is an illustration of a flowchart of a process for producing an air jet in accordance with an advantageous embodiment.

With reference now to FIG. 18, an illustration of a flowchart of a process for producing an air jet is depicted in accordance with an advantageous embodiment. The process illustrated in FIG. 18 may be implemented on a platform, such as platform 302 in FIG. 3.

The process begins by positioning an outer element inside a control surface of a platform (operation 1800). In operation 1800, the outer element may have a lateral slot. The control surface may have an ejection slot that is aligned with the lateral slot. For example, without limitation, the control surface may be a wing or a flap of the platform.

Thereafter, the process positions an inner element inside the outer element (operation 1802). In operation 1802, the inner element may have a helical slot that wraps around an outer surface of the inner element such that a number of portions of the helical slot overlap with the lateral slot. The process then sends an airflow into the inner element by a fluid source (operation 1804). In operation 1804, the pressure of the airflow may be regulated by a control unit.

The process then rotates the inner element inside the outer element by a motor (operation 1806). In operation 1806, the rotational speed may be regulated by the control unit. The sending of the airflow and the rotation of the inner element produces an air jet that traverses the control surface. The traversing air jet increases the lift of the platform, while reducing the amount of airflow supplied.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, the different advantageous embodiments may be applied to other types of platforms. For example, without limitation, other advantageous embodiments may be applied to a mobile platform, a stationary platform, a land-based structure, an aquatic-based structure, a space-based structure, and/or some other suitable object in which fluid flow may be present. More specifically, the different advantageous embodiments may be applied to, for example, without limitation, a rotorcraft, a submarine, a bus, a personnel carrier, a tank, a train, an automobile, a spacecraft, a surface ship, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a platform configured to move in a streamwise direction, the platform having a control surface;
an actuation unit associated with the control surface, the actuation unit including an inner element having a helical slot, the actuation unit also including an outer element having a lateral slot, wherein the inner element is located inside the outer element;
a fluid source configured to supply an airflow to the actuation unit, the actuation unit configured to form an air jet flowing in the streamwise direction, and the inner element configured to receive the airflow from the fluid source; and
a control unit for moving the air jet across the control surface.

2. The apparatus of claim 1, further comprising:
a motor associated with the control unit, the motor configured to cause the inner element to rotate, wherein the control unit is configured to move the air jet across the control surface by regulating a rotational speed of the inner element and wherein the control unit is configured to regulate a pressure of the airflow.

3. The apparatus of claim 2, wherein:
a number of portions of the helical slot overlap with the lateral slot, wherein the control unit is further configured to regulate the pressure to push the airflow out of the number of portions to form a number of air jets that flow in the streamwise direction.

4. The apparatus of claim 3, wherein the inner element is configured to rotate inside the outer element such that the number of portions of the helical slot that overlap with the lateral slot are moved in a periodic motion, wherein the number of air jets are configured to move across the surface of the control surface, and wherein the number of air jets moving across the surface of the control surface are configured to increase an amount of lift generated by the control surface.

5. The apparatus of claim 1, wherein the platform is an aircraft, wherein the control surface is a flap, wherein the actuation unit is located inside the flap, and wherein the flap and the actuation unit are configured such that the air jet flows out of an ejection slot of the flap.

6. The apparatus of claim 5, further comprising:
a number of actuation units located inside the flap, wherein the fluid source is configured to send the airflow to the number of actuation units, wherein the number of actuation units are configured to form a number of air jets flowing in the streamwise direction, wherein the number of air jets are configured to move across an upper surface of the flap, and wherein the upper surface is substantially an entire length of the flap.

7. The apparatus of claim 1, wherein the control surface is a wing, wherein actuation unit is located inside the wing, and wherein the air jet is configured to flow out of an ejection slot of the wing.

8. The apparatus of claim 1, wherein the platform is an aircraft and wherein the fluid source is one of an air compressor of the aircraft and an engine of the aircraft.

9. An apparatus comprising:
a control surface of an aircraft, the control surface extending in a spanwise direction of the aircraft and having an ejection slot extending in the spanwise direction;
an outer cylinder located inside the control surface and centered on an axis, the outer cylinder having a lateral slot aligned with the ejection slot;
an inner cylinder located inside the outer cylinder and centered on the axis, the inner cylinder having a helical slot, wherein the helical slot wraps around an outer surface of the inner cylinder, wherein a number of portions of the helical slot overlap with the lateral slot, and wherein the inner cylinder is configured to rotate inside the outer cylinder; and
a fluid source configured to send an airflow into the inner cylinder.

10. The apparatus of claim 9, further comprising:
a control unit, wherein the control unit is configured to regulate a pressure of the airflow, wherein a motor associated with the control unit is configured to cause the inner cylinder to rotate, wherein the apparatus is configured such that the pressure pushes the airflow out of the number of portions to form a number of air jets that flow in a direction that is substantially perpendicular to the axis, wherein the number of air jets are configured to move across a surface of the control surface in a direction that is substantially parallel to the axis, and wherein the number of air jets moving across the surface of the control surface is configured to increase an amount of lift generated by the control surface.

11. The apparatus of claim 10, wherein the apparatus is further configured such that inner cylinder rotating inside of the outer cylinder moves the number of portions in a periodic motion and wherein the number of air jets are configured to move in a periodic motion across a surface of the control surface in a direction that is substantially parallel to the axis.

12. The apparatus of claim 11, wherein the control unit is configured to regulate a rotational speed of the inner cylinder to adjust a speed of the periodic motion of the number of air jets moving across the surface of the control surface.

13. The apparatus of claim 9, wherein the control surface is a flap, wherein the outer cylinder and the inner cylinder are located inside the flap, and wherein the number of air jets are configured to flow out of the ejection slot of the flap.

14. A method of moving air across a control surface of an aircraft, the method comprising:
forming a slot on the control surface of the aircraft, the slot extending in a spanwise direction; sending a stream of air out of a portion of the slot, wherein the stream of air flows in a streamwise direction of the aircraft; and
moving the stream of air in a periodic motion along the spanwise direction of the slot, wherein moving the stream is accomplished by directing air from a source into an inner element disposed inside the control surface, out of a helical slot in the inner element, into an outer element disposed inside the control surface, and out of a lateral slot of the outer element.

15. The method of claim 14, wherein sending the air from a fluid source into an actuation unit of the control surface of the aircraft increases an amount of lift generated by the control surface of the aircraft.

16. The method of claim 15, further comprising:
regulating a pressure of the air by a control unit;
wherein the pressure pushes the stream of air out the portion of the slot; and
regulating a speed of the periodic motion of the stream of air.

17. The method of claim 15, wherein the control surface is a flap and wherein the stream of air flows out of an ejection slot of the flap.

18. The method of claim 17, further comprising:
sending a number of streams of air out a number of portions of the ejection slot, wherein the number of streams of air flow in a streamwise direction of the aircraft; and
moving the number of streams of air in periodic motions along the spanwise direction of the ejection slot, wherein the number of streams of air moves across an upper surface of the flap, and wherein the upper surface is substantially an entire length of the flap.

19. The method of claim 15, wherein the control surface is a wing and wherein the number of streams of air flows out of an ejection slot of the wing.

20. The method of claim 14, wherein the source is one of an air compressor of the aircraft and an engine of the aircraft.

21. A method of producing an air jet, the method comprising:
positioning an outer element inside a control surface of a platform, the outer element having a lateral slot;
positioning an inner element inside the outer element, the inner element having a helical slot, wherein the helical slot wraps around an outer surface of the inner element and wherein a number of portions of the helical slot overlap with the lateral slot;

sending an airflow into the inner element by a fluid source; and rotating the inner element inside the outer element by a motor, wherein rotating includes the airflow moving through the helical slot of the inner element, through the lateral slot of the outer element, and out of the control surfaces.

22. The method of claim 21, further comprising:
regulating a pressure of the airflow by a control unit; and
regulating a rotational speed of the inner element.

23. The method of claim 21, wherein the platform is an aircraft, wherein the control surface is a flap having an ejection slot, further comprising:

aligning the lateral slot with the ejection slot, wherein the outer element and the inner element are located inside the flap.

24. The method of claim 21, wherein the platform is an aircraft, wherein the control surface is a wing having an ejection slot, and further comprising:

aligning the lateral slot with the ejection slot, wherein the outer element and the inner element are located inside the wing.

25. The method of claim 21, wherein the fluid source is one of an air compressor of the aircraft and an engine of the aircraft.

26. The apparatus of claim 1, wherein the inner element is configured to rotate inside the outer element.

* * * * *